United States Patent [19]
Westre et al.

[11] Patent Number: 5,866,272
[45] Date of Patent: Feb. 2, 1999

[54] TITANIUM-POLYMER HYBRID LAMINATES

[75] Inventors: Willard N. Westre, Bellevue; Heather C. Allen-Lilly, Renton; Donald J. Ayers, Snohomish; Samuel E. Cregger; David W. Evans, both of Kent; Donald L. Grande, Des Moines; Daniel J. Hoffman, Federal Way; Mark E. Rogalski, Issaquah; Robert J. Rothschilds, Kent, all of Wash.

[73] Assignee: The Boeing Company, Seattle, Wash.

[21] Appl. No.: 585,304

[22] Filed: Jan. 11, 1996

[51] Int. Cl.$^6$ .............................. B32B 3/12; B32B 15/08; B64C 1/00

[52] U.S. Cl. ..................... 428/593; 428/608; 428/660; 428/220; 428/332; 428/457; 428/626; 428/118; 244/119

[58] Field of Search ...................... 428/593, 606, 428/608, 615, 292, 293, 458, 660, 220, 332, 457, 626, 118; 244/119

[56] References Cited

U.S. PATENT DOCUMENTS 3,758,234  9/1973  Goodwin .
3,888,661  6/1975  Levitt et al. .

(List continued on next page.)

FOREIGN PATENT DOCUMENTS 307 215 B1  3/1989  European Pat. Off. .
463 611 A2  1/1992  European Pat. Off. .

OTHER PUBLICATIONS

Metal Progress 1978 Date Handbook, A–gray ed., pp. 98–99, Jun. 1978.

NASA Contractor Report, *Analytical and Experimental Investigation of Aircraft Metal Structures Reinforced With Filamentary Composites, Phase I –Concept Development and Feasibility*, by S. Oken and R.R. June, Prepared by the Boeing Company for Langley Research Center, NASA CR–1859. (1970).

Bruce Smith, Paul Proctor, and Pierre Sparaco, "Airframers Pursue Lower Aircraft Costs," *Aviation Week & Space Technology*, Sep. 5, 1994.

Glyn Lawcock, Lin Ye, and Yiu–Wing Mai, "Novel Fiber Reinforced Metal Laminates for Aerospace Applications—A Review," *SAMPE Journal*, vol. 31, No. 1, Jan./Feb. 1995, pp. 23–31.

Alex Velicki, "Materials and Structures for the HCST," *Aerospace Engineering*, Apr. 1995, pp. 17–19.

W. Steven Johnson, Edward Li, and Jennifer Miller, "High Temperature Hybrid Titanium Composite Laminates: An Early Analytical Assessment," Tenth International Conference on Composite Materials, ICCM–10, Whistler, British Columbia, Canada, Aug. 14–18, 1995.

Abstract of Patent Application of William Russell Kingston, Unknown Serial Number (no month, no year).

(List continued on next page.)

*Primary Examiner*—John J. Zimmerman
*Assistant Examiner*—Michael LaVilla
*Attorney, Agent, or Firm*—Christensen, O'Connor, Johnson & Kindness PLLC

[57] ABSTRACT

The invention provides a hybrid laminate and skin panels of hybrid laminate structure that are suitable for a supersonic civilian aircraft. The hybrid laminates include layups of layers of titanium alloy foil and composite plies, that are optimally oriented to counteract forces encountered in use, that are bonded to a central core structure, such as titanium alloy honeycomb. The reinforcing fibers of the composite plies are selected from carbon and boron, and the fibers are continuous and parallel oriented within each ply. However, some plies may be oriented at angles to other plies. Nevertheless, in a preferred embodiment of the invention, a substantial majority of, or all of, the fibers of the hybrid laminates are oriented in a common direction. The outer surfaces of the laminates include a layer of titanium foil to protect the underlying composite-containing structure from the environment, and attack by solvents, and the like.

25 Claims, 6 Drawing Sheets

U.S. PATENT DOCUMENTS

| | | |
|---|---|---|
| 3,936,277 | 2/1976 | Jakway et al. . |
| 3,939,024 | 2/1976 | Hoggatt . |
| 3,959,091 | 5/1976 | Moji et al. .......................... 204/38 A |
| 3,989,876 | 11/1976 | Moji et al. .............................. 428/472 |
| 3,991,928 | 11/1976 | Friedrich et al. ....................... 228/190 |
| 4,010,884 | 3/1977 | Rothman .................................. 228/190 |
| 4,029,838 | 6/1977 | Chamis et al. .......................... 428/301 |
| 4,115,611 | 9/1978 | Stoltze et al. . |
| 4,132,828 | 1/1979 | Nakamura et al. . |
| 4,137,370 | 1/1979 | Fujishiro et al. . |
| 4,141,802 | 2/1979 | Duparque et al. . |
| 4,356,678 | 11/1982 | Andrews et al. ......................... 52/799 |
| 4,411,380 | 10/1983 | McWithey et al. ..................... 278/181 |
| 4,473,446 | 9/1984 | Locke et al. ........................... 204/32.1 |
| 4,489,123 | 12/1984 | Schijve et al. .......................... 428/213 |
| 4,500,589 | 2/1985 | Schijve et al. .......................... 428/213 |
| 4,624,897 | 11/1986 | Ito . |
| 4,714,509 | 12/1987 | Gruber ................................. 156/272.2 |
| 4,715,923 | 12/1987 | Knoll .................................... 156/380.9 |
| 4,753,850 | 6/1988 | Ibe et al. . |
| 4,775,602 | 10/1988 | Rasch . |
| 4,777,098 | 10/1988 | Takamura et al. . |
| 4,790,898 | 12/1988 | Woods .................................... 156/166 |
| 4,816,347 | 3/1989 | Rosenthal et al. . |
| 4,859,267 | 8/1989 | Knoll .................................... 156/273.7 |
| 4,894,105 | 1/1990 | Dyksterhouse et al. ................ 156/181 |
| 4,917,968 | 4/1990 | Tuffias et al. . |
| 4,919,739 | 4/1990 | Dyksterhouse et al. ................ 156/181 |
| 4,935,291 | 6/1990 | Gunnink ................................. 428/213 |
| 4,943,472 | 7/1990 | Dyksterhouse et al. ................ 428/240 |
| 4,956,026 | 9/1990 | Bell . |
| 4,992,323 | 2/1991 | Vogelesang et al. ................... 428/215 |
| 5,006,419 | 4/1991 | Grunke et al. . |
| 5,008,157 | 4/1991 | Paxos . |
| 5,009,966 | 4/1991 | Garg et al. . |
| 5,030,488 | 7/1991 | Sobolev ................................. 428/35.9 |
| 5,039,571 | 8/1991 | Vogelesang et al. ................... 428/213 |
| 5,076,875 | 12/1991 | Padden . |
| 5,079,101 | 1/1992 | Murayama . |
| 5,100,737 | 3/1992 | Colombier et al. . |
| 5,104,460 | 4/1992 | Smith, Jr. et al. . |
| 5,122,422 | 6/1992 | Rodhammer et al. . |
| 5,128,198 | 7/1992 | Dyksterhouse et al. ................ 428/240 |
| 5,143,276 | 9/1992 | Mansbridge et al. ................... 228/157 |
| 5,160,561 | 11/1992 | Gruber ................................... 156/175 |
| 5,160,568 | 11/1992 | Gruber ................................... 156/430 |
| 5,160,771 | 11/1992 | Lambing et al. ......................... 428/57 |
| 5,181,647 | 1/1993 | Runyan ................................. 228/44.3 |
| 5,200,004 | 4/1993 | Verhoeven et al. . |
| 5,213,904 | 5/1993 | Banker . |
| 5,215,832 | 6/1993 | Hughes et al. . |
| 5,232,525 | 8/1993 | Smith et al. . |
| 5,242,759 | 9/1993 | Hall . |
| 5,260,137 | 11/1993 | Rosenthal et al. . |
| 5,403,411 | 4/1995 | Smith et al. . |
| 5,429,326 | 7/1995 | Garesché et al. . |
| 5,429,877 | 7/1995 | Eylon . |
| 5,460,774 | 10/1995 | Bachelet . |
| 5,578,384 | 11/1996 | Kingston . |

OTHER PUBLICATIONS

Nasa Contractor Report, Analytical and Experimental Investigation of Aircraft Metal Structures Reinforced with Filamentary Composites, *B. Blichfeldt and J.E. McCarty*, Prepared by The Boeing Company for Langley Research Center, Date Unknown (no month, 1972).

FIBERITE® Data Sheet 5: "Fabricating with Aromatic Polymer Composite, APC–2," 1986. (no month).

TITANIUM-POLYMER HYBRID LAMINATES

FIELD OF THE INVENTION

The invention relates to supersonic aircraft skin panels of a hybrid laminate structure. More particularly, the hybrid laminate includes a central reinforcing core layer having bonded to each of its sides a layup that includes layers of titanium alloy foil with layers of a composite of fiber-filled organic resin between the foil layers.

BACKGROUND OF THE INVENTION

With the continuously increasing demand for international and long distance air travel, there is a perceived need for a supersonic civilian transport aircraft. However, it is expected that such an aircraft would be expensive to produce so that airlines, and their customers, would be reluctant to use the aircraft unless the high cost can be offset by other factors, besides the convenience of high speed. Some of these factors include minimizing the mass of the aircraft so that it would consume less fuel, reduce the airline's cost per passenger mile, and increase the aircraft's range and payload. Moreover, the aircraft should have an extended life, thereby allowing the airlines to recoup their investment over a longer period of time.

The need for increased fuel efficiency, long range, high payload and longer life of a supersonic civilian transport aircraft imposes exacting new demands on materials of construction. For example, the fuselage, wings, and other components of the aircraft's outer shell, should be light, but also have high strength-to-weight ratio properties, calling for low density, high strength materials. Moreover, the materials should have high modulus, fatigue resistance for long life, and high thermo-mechanical endurance to withstand stresses under the high temperatures encountered during supersonic flight. From a safety standpoint, the materials should be damage-resistant and damage-tolerant, and from a preventive maintenance standpoint, the materials should provide visible signs of damage, long before actual failure.

Fabricating aircraft fuselages and exterior panels, such as wings and control surfaces from metals, such as titanium alloys, may not meet all the performance criteria for an advanced supersonic civilian aircraft. Titanium alloys have relatively high density compared to the target density for an advanced supersonic civilian aircraft, and are relatively expensive. Moreover, titanium panel sizes are limited, due to physical property constraints, so that a large aircraft would require many joined panels. An increased number of joints results in increased weight, an undesirable factor. Titanium alloys also have relatively low fatigue strength and relatively high crack-growth rates so that the life of an aircraft may not be extended to meet the criterion set for continuous service in supersonic civilian transport. Consequently, titanium alloys may not be the optimum material of choice.

As an alternative, aircraft fuselages and exterior panels could be fabricated from polymeric composites. Such composites include a thermosetting or thermoplastic polymer ("resin") matrix within which is embedded reinforcing fibers, such as carbon fibers. However, performance of these polymeric composites may change with time upon repeated exposure to the high temperatures encountered during supersonic flight. Such temperatures clearly vary depending upon the speed of flight, for example temperatures of up to about 350° F. (about 175° C.) are expected at mach 2.4. Polymeric composites are also susceptible to undetectable mechanical damage which may compromise structural integrity, and which requires additional material, to compensate for unknown risks thereby increasing aircraft mass. Furthermore, polymeric composites are also susceptible to damage from lightning strikes and therefore require additional conductive structure for protection. This also adds mass to the aircraft.

Prior art attempts at developing hybrid laminates that include layers of polymeric composite and layers of metal have not produced composites with the requisite combination of low density and physical properties necessary for use in a fuselage or exterior skin panels of a supersonic civilian aircraft. A laminate must meet the strength, modulus, fatigue resistance, and thermo-mechanical endurance properties discussed above. It should also have enhanced damage tolerance, and should desirably dent in a manner similar to metals thereby allowing detection of damage before significant physical property deterioration occurs. The polymeric composite layers in the laminate should be protected from thermal-induced oxidation, water ingress, and potential damage that could be caused by exposure to fuel and other solvents. Moreover, the laminate should exhibit high strength, and resist propagation of cracks, even from those points where it has been drilled-through to receive fasteners. The hybrid laminate should also be compatible with fusing to a core structure that may form part of the laminate structure, such as an aircraft panel.

SUMMARY OF THE INVENTION

The invention provides hybrid laminates, including layers of titanium alloy foil alternating with layers of a polymeric matrix with reinforcing fibers embedded therein, that form the skin (e.g., fuselage, wings, vertical and horizontal stabilizers, and strakes) of a supersonic civilian aircraft. The laminates possess high strength-to-weight ratio, modulus, fatigue resistance, and have outstanding thermal-mechanical endurance properties. Moreover, crack propagation is very slow, compared to monolithic titanium alloys, so that the life span of the aircraft is enhanced. The laminates dent in a manner similar to metals allowing detection of damage before significant deterioration of physical properties occurs. Moreover, since the outer surfaces of the hybrid laminates are of titanium alloy foil, the laminates are resistant to fuel and other solvents that may otherwise adversely affect a polymeric composite. In addition, the polymeric composite layers of the hybrid laminates are protected from oxidation, water ingress, and the deleterious effects of ultraviolet light by the outer covering of titanium alloy foil.

The hybrid laminates of the invention preferably include a central layer of a core structure covered on both sides with layups that include layers of titanium alloy foil with at least a one-ply layer of a polymeric matrix composite interposed between each foil layer, to produce a symmetrical laminate. The layers of metallic foil are preferably about 0.01 to about 0.003 inches thick, and made of a beta titanium that has been heat-treated to a yield strain of greater than about 1%. The layers of polymeric composite are made up of one or more plies, each layer is about 0.005 to about 0.03 inches thick.

The preferred organic polymeric composite is formed from a prepreg in the form of a tape of continuous parallel reinforcing fibers coated with a resin to form a continuous strip. Thus, when the prepreg is laid down to form a composite ply, each composite ply includes a matrix of a resin (that is resistant to the high temperatures encountered during supersonic flight) reinforced with parallel fibers. These fibers make up from about 50 to about 70 volume percent of the resin and fibers when the fiber is carbon, and from about 40 to about 60 volume percent when the fiber is boron. When a mixture of carbon and boron fibers is used, total fiber volume is in the range 75 to 80 volume percent. In accordance with the invention, the composite plies may be oriented to provide a specific fiber orientation in each layer of composite that is best suited for the particular service of the laminate.

The resin used for making the organic polymeric layers is selected from those resins that are able to repeatedly withstand temperatures encountered during supersonic flight without undue softening or weakening that results in reduction of physical properties. Similarly, the reinforcing fibers are selected from those fibers that are compatible with the resin, that provide an enhanced strength composite, and that are able to repeatedly withstand the temperatures encountered during supersonic flight without significant loss of physical properties.

The resin is also compatible with, and is preferably selected to, bond tenaciously to the titanium alloy foil. In order to achieve such tenacious bonding, the surface of the titanium foil is preferably pretreated to produce a surface more able to bond chemically and mechanically with the resin. While it is preferred that the resin bond to the titanium alloy foil without the assistance of adhesives, adhesives, with or without bonding agents such as silanes, may be used to facilitate and enhance bonding.

As a result of the unique hybrid laminate structure of the invention, crack-growth rates are dramatically lower than for titanium alloy structures. Indeed, crack-growth is only 0.2% of the rate for monolithic titanium, of the same alloy as the foil layers, that has undergone the same heat treatment.

The hybrid laminates of the invention also demonstrate high open-hole tensile and compressive strengths that facilitate mechanical joining of the laminates while minimizing the risk of failure from around a throughbore through which a fastener extends and where forces concentrate.

The invention also provides hybrid laminate structures in the form of aircraft outer skin panels, such as fuselage sections, wing sections, strakes, vertical and horizontal stabilizers, and the like. The laminates are preferably symmetrical and, as explained above, include a core structure as a central layer sandwiched between outer layers of layups of composite plies and metallic foil. The core structure may include, for example, titanium alloy honeycomb. The adjacent layers of foil or composite are tightly bonded to the honeycomb layers at interfaces between these layers and the honeycomb material. This structure provides a low density (light weight), high strength, high modulus, tailorable structure that has exceptional fatigue resistance and excellent thermal-mechanical endurance properties. The hybrid laminates are resistant to zone 1 lightning strikes due to the outer titanium foil and are therefore able, for example, to protect fuel stored within a wing. The structure is particularly suitable for forming the skin portions of a supersonic civilian aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings illustrating embodiments of the invention, wherein.

DETAILED DESCRIPTION OF THE PREFERRED EMBODIMENTS

The hybrid laminates of the invention include spaced-apart layers of a metallic foil, with a layer or layers of an organic polymeric matrix composite, that includes a thermosetting or thermoplastic resin matrix with parallel-oriented reinforcing fibers embedded therein, interposed between the metallic foil layers. The invention also provides aircraft skin panels, such as fuselage, wings, strakes, vertical and horizontal stabilizers, and the like, made of a sandwiched construction that includes two outer layups, that each include layers of metallic foil and composite layers, with a layer of core material interposed between, and tightly bonded to, the outer layup layers to form a hybrid laminate structure. Preferably, the outermost layer of the hybrid laminates is of metal foil to protect the underlying organic composite material from the environment and from exposure to chemical solvents. In certain embodiments, the core material is not used and the hybrid laminate skins are reinforced in another manner.

The preferred metallic foil is about 0.01 to about 0.003 inches thick (about $250 \times 10^{-6}$ to about $70 \times 104^{-6}$ m). Moreover, while aluminum and aluminum alloy foils may be used, foils of titanium and its alloys are preferred. In particular, foils of a beta titanium alloy are most preferred, particularly when the alloy is heat-treated to a yield strain of greater than 1%. This allows full utilization of current fiber properties. Such heat treatment provides the advantage of improving the load limit and ultimate load capability of the laminate. The invention therefore allows the use of the metal alloy foils up to their elastic yield strain, thereby allowing increased operating load as compared to the use of titanium alloy alone.

In order to facilitate bonding of the metallic foil to interfacing organic composite layers, the metallic foil may be subject to surface treatment processes. In particular, it is preferred that preferred titanium alloy foil be subjected to a process that causes a porous adhesion-promoting layer to form on the surface since such a surface bonds more tenaciously to certain of the high temperature organic resins, discussed below. Useful surface treatment processes are described, for example, in U.S. Pat. Nos. 3,959,091; 4,473,446; and 3,989,876, which are incorporated by reference.

In a preferred pretreatment method, titanium foils are first immersed for about 5 minutes in a solution having a concentration of 4 lb of TURCO 5578 (supplied by Atochem, Inc. of Westminster, Calif.) per gallon of water that is maintained at about 190° F. Thereafter, the foils are removed and rinsed with warm water, followed by a cold water rinse. After rinsing thoroughly, the foils then undergo a nitric hydrofluoric acid etch. This etching is carried out in a solution containing 22 vol. % nitric acid and 3 vol. % hydrofluoric acid, maintained at 120° F. After etching for about 4 to about 6 minutes, the foils are removed and rinsed in cold water for about 5 minutes. Then the foils are subjected to a chromic acid anodization process. In this process, the foils are anodized in chromic acid at about 4±1 volts for about 20 minutes. The chromic acid solution contains from about 6 to about 7.5 oz. of chromic acid per gallon of water, and a quantity of hydrofluoric acid sufficient to maintain a current density of 2 amps/ft$^2$ at a potential difference of from about 9 to about 10 volts. After anodization, the foils are rinsed in cold water, preferably within about 2 minutes after anodization, for from about 10 to about 15 minutes. Thereafter, the rinsed foils are dried in an oven at a maximum of 160° F. The pretreated foils are then used to form the metallic foil layers of the layups of the hybrid laminates of the invention.

According to the invention, optional adhesives and silane bonding agents may be used to facilitate and enhance metal to composite bonding, and also core to metal, and core to composite bonding.

Each layer of organic composite in the hybrid laminate of the invention is made up of at least one ply. Each layer of plies is preferably about 0.005 to about 0.03 inches thick ($125 \times 10^{-6}$ to $760 \times 10^{-6}$ m). Each ply includes an organic polymeric resin, either thermosetting or thermoplastic, within which is embedded parallel reinforcing fibers. While the fibers within each ply of organic composite are parallel, these fibers may be at right angles, or indeed any other angle, to the fibers in another ply of organic composite in the hybrid laminate. As will be explained later, orientation of the fibers is selected based upon the expected forces to which the aircraft outer shell component will be subjected.

In order to withstand the high temperatures to which the outer shell of an aircraft is exposed during supersonic flight, the resin must be "resistant to high temperatures". In other words, the resin should not unduly soften, or cause delamination with resultant substantial and unacceptable reduction in physical and mechanical properties, when repeatedly exposed to the temperatures encountered during supersonic flight, for example temperatures of at least about 350° F. (about 175° C.) at about mach 2.4 depending on flight speed. Exemplary of those resins that meet these requirements are polyaryletherketone; polyetheretherketone; polyimides; polyarylethersulfone; oxydiphthalic, dianhydride 3,4' oxydianiline and functional derivatives of the latter, for instance, a derivative with 10% P-phenylenediamide and phthalic anhydride end-cap monomers; or with 4-(3-aminophenoxy)-4-phenylethynyl benzophenone end-cap monomers. The preferred polymers are polyimide resins sold as PIXA by Mitsu Toatsu of Tokyo, Japan, and phenylethynyl-containing polyimides sold as PETI-5 by Fiberite, Inc. of Greenville, Tex. Clearly, other resins meeting the condition of maintaining requisite strength at temperatures encountered during supersonic flight are also useful.

In a preferred embodiment, the elongate parallel fibers used as a reinforcement in the organic polymeric matrix layers are selected from the carbon and boron fibers. In certain embodiments, as will be explained below, it is preferred to use a mixture of carbon and boron fibers as reinforcement in a single ply. The preferred carbon fibers are those sold as carbon of "intermediate or high strength" with moduli of 35–50 Msi and tensile elongation failure of 1.5% or greater. Typically these fibers are produced from the PAN (polyacrylonitrile) precursor family of fibers. The preferred boron fibers are the smallest boron fibers (at least about 4–7 mil) with highest tensile elongation. The preferred boron/carbon fiber mixture prepregs are sold under the trade name HYBOR (by Textron Specialty Materials of Lowell, Mass.). This fiber combination permits a higher fiber volume percentage in the plies and utilizes the high compressive properties of boron with the high tensile properties of carbon. Each type of fiber is best suited for particular applications, as discussed below.

Each of the principal components of the structure constructed in accordance with the present invention, i.e., the titanium alloy foil, the polymer composite material, and the core structure, are generally preconstructed and arranged for use in conjunction with the present invention. The composite material generally comprises a high temperature polymeric resin containing oriented, continuous carbon, or other, strengthening fibers. The composite material is usually supplied in the form of an elongate ribbon or tape wound upon a spool. The material is then unwound from the spool and applied to the receiving surface. Similarly, the core, if any, is premanufactured and supplied for use in conjunction with the present invention.

The hybrid laminates may be made by any of a number of methods. However, in the case of thermoplastic composites, it is preferred that the laminates are prepared by successively laying down long continuous strips of thermoplastic resin pre-impregnated fibrous tapes ("prepregs"), by means of a thermoplastic application head, directly onto the treated outer surface of a foil. By laying down strips of tape side-by-side while consolidating these through the application of heat and pressure, a continuous ply of composite with parallel-oriented fibers is produced. Thereafter, another ply or plies of composite may be laid down on top of the first ply, depending upon the properties needed of the laminate. The ply or plies make up a layer of composite. Then, a layer of foil is rolled out over the consolidated composite layer and is bonded, for example heat-fused, onto the composite. Thereafter, a next layer of organic composite is formed on top of the metallic foil by laying down a ply or plies, as described above. Finally, after laying down the predetermined number of layers of metallic foil and organic polymeric matrix, an outer layer of metallic foil is applied. This is an important aspect of the invention since the outer layers of foil protect the underlying organic composite of the hybrid laminates from the environment and attack by fluids.

Alternative methods of fabrication, some discussed in more detail below, are also useful. For example, all layers of the hybrid laminate may be stacked in an autoclave or press, without prefusion of layers, and may then be fused under applied heat and pressure into a unitary laminate.

Figure 1:
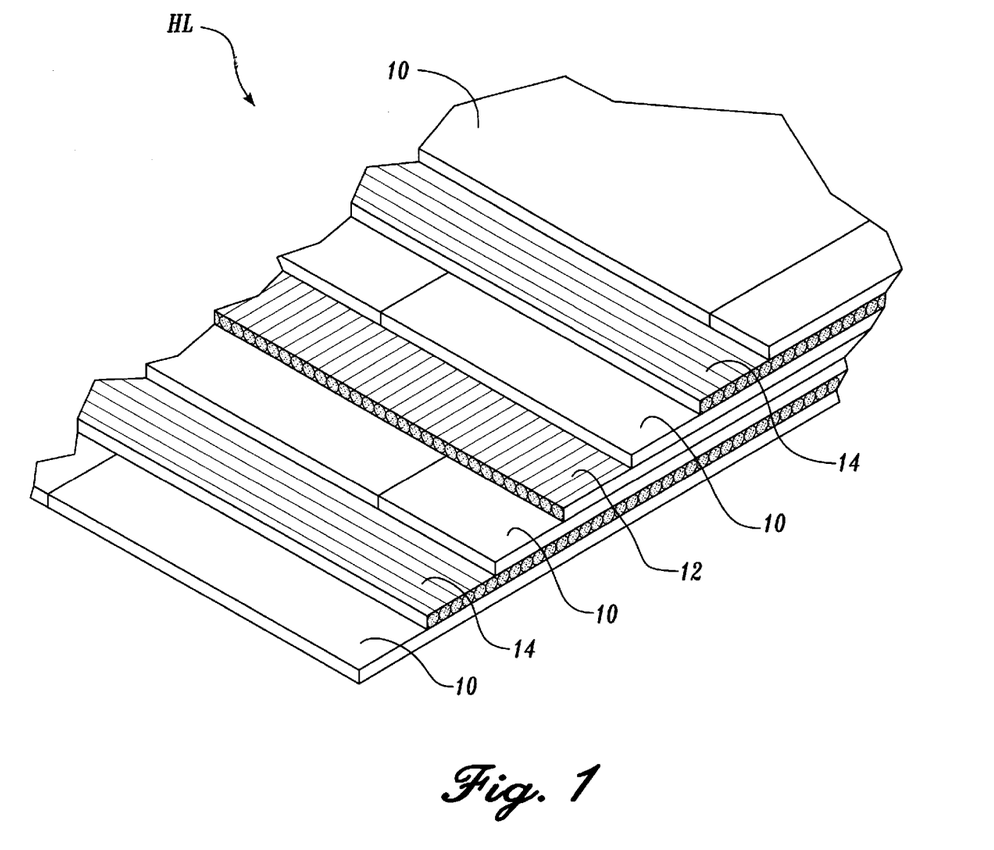
FIG. 1 is a schematic cross-sectional diagram showing the layers of an embodiment of a layup of a metallic foil and composite that forms part of a hybrid laminate according to the invention.

The hybrid laminates of the invention are better understood with reference to FIG. 1, a schematic diagram showing an exemplary embodiment of the laminates. Clearly, other layered arrangements are also contemplated, and some are shown below. The layup HL has alternating layers of titanium alloy foil 10 with at least one ply of composite interposed between each successive foil layer. A 90° cross-ply of organic composite 14 is interposed between the first two titanium foil layers. A 0° ply 12 is interposed between the second and third titanium foil layers 10. Finally, another cross-ply is interposed between the third and fourth titanium foil layers. In this particular layup, two-thirds of the fibers are arranged in a 90° cross-ply direction, while one-third of the fibers are arranged in a zero degree direction. In certain preferred embodiments, discussed below, substantially all fibers are arranged in a zero degree direction and in other preferred embodiments, also discussed below, some fibers are arranged at a 90° cross-ply direction and at +45° or −45° directions. In accordance with the invention, it is preferred that the fibers of a substantial majority of (more than about two-thirds), or all of, the plies of the laminate are oriented in a common direction. The foils 10 are butt-joined together with minimal spacing between co-extensive foils. Moreover, the butt joints are offset, as illustrated schematically, so that laminate strength is not compromised.

Figure 1A:
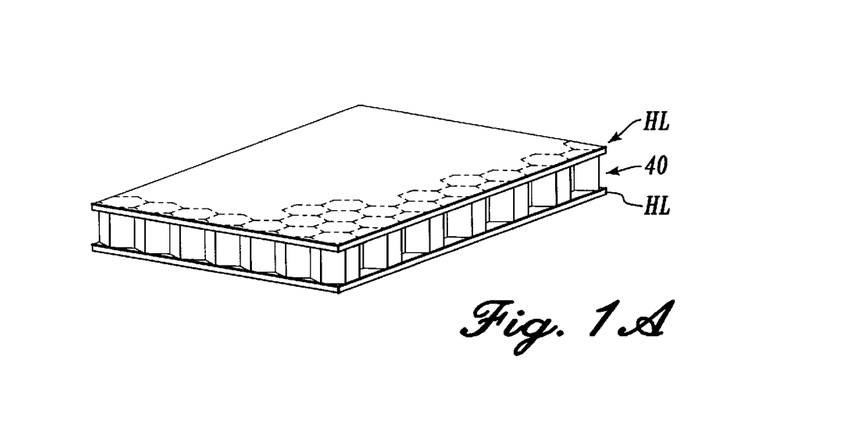
FIG. 1A is a schematic cross-sectional illustration of an embodiment of the hybrid composite laminate structure of the invention with a honeycomb core structure.

Preferably, the hybrid laminates of the invention are symmetrical with a central layer that is a lightweight core structure 40, such as titanium alloy honeycomb material, as shown in FIG. 1A. Thus, the core layer 40 is surrounded, or covered, on both sides by identical metallic foil-polymer composite layups HL forming outer coverings.

While the description that follows sometimes illustrates only the metallic foil-polymer composite layups HL, it should be understood that the hybrid laminate structures each include a central core structure layer covered on both sides by adhered identical metallic foil-polymer composite layups to form a symmetrical hybrid structure of the invention.

Figure 2:
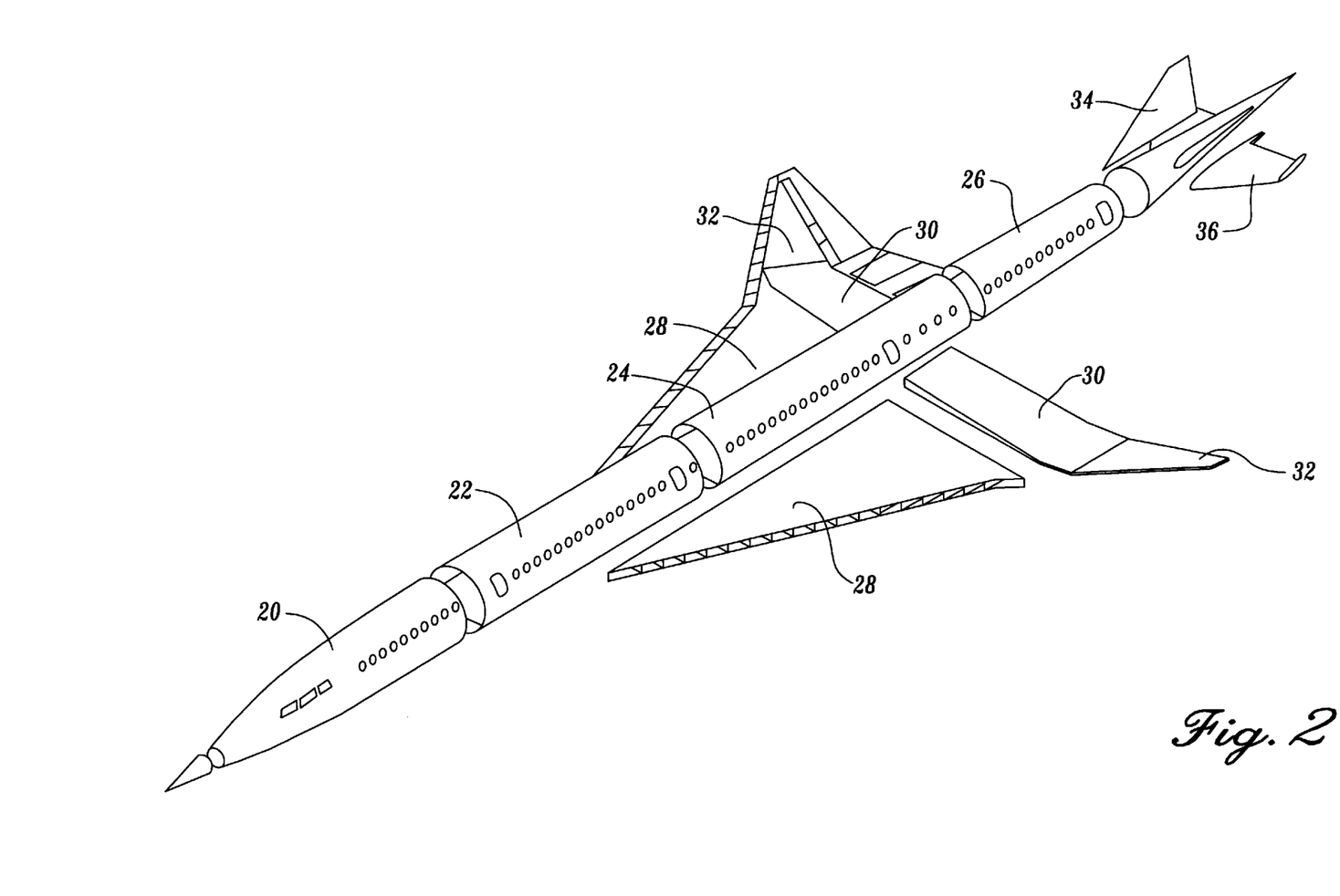
FIG. 2 is a schematic diagram illustrating an embodiment of the sections of an aircraft outer shell fabricated from hybrid composite laminates in accordance with the invention.

FIG. 2 is a simplified schematic, partially exploded view, showing a hybrid laminate fuselage and exterior panels of a supersonic aircraft. In this exemplified representation, four substantially cylindrical fuselage sections are adapted to connect to each other end-to-end to form a substantially cylindrical fuselage. In other designs more sections may be required. These sections include a frontal end 20 of the fuselage that has a substantially cylindrical shape with a tapering front-end designed to receive a nose cone; a second cylindrical fuselage section 22 with diameter the same as the diameter of the rear of fuselage front-end 20; a third fuselage section 24 of substantially cylindrical shape and of the same diameter as the second fuselage section; and a rear-end fuselage section 26 of slightly tapering cylindrical shape with a widest diameter substantially the same as the diameter of the third fuselage section. The wings of the embodiment shown in FIG. 2 are of the delta-type, including a pair of horizontally-extending, triangular-shaped strakes 28 extending outboard from either side of the cylindrical fuselage portions 22 and 24. A pair of substantially rectangular wing boxes 30 abut the rear ends of the strakes 28 and extend outboard from attachment to fuselage section 24 to the vicinity of the outer extremities of the strakes. An outboard wing 32 of substantially triangular shape extends from the outboard end of the each of the wing boxes 30. Thus, the strake and wing on each side of the aircraft form a coplanar upper surface that extends from the upper surface of the strake 28 to the upper surface of its adjoining wing box 30 and thence to the upper surface of the outboard wing 32. A coplanar lower surface is similarly formed. The trapezoidal vertical stabilizer 34 and trapezoidal horizontal stabilizers 36 are also, in accordance with the invention, fabricated of hybrid laminates.

Figure 3A:
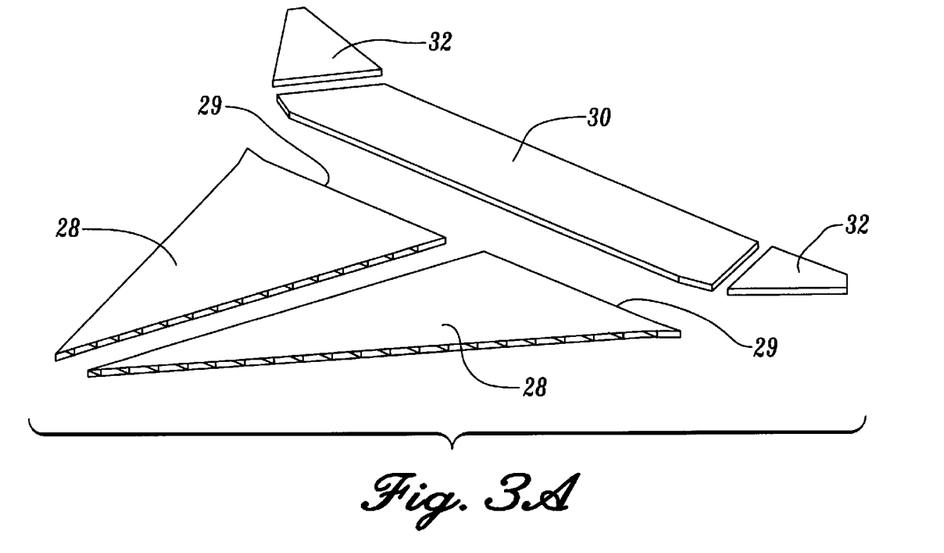
FIG. 3A is a schematic exploded view of embodiments of strakes and a wing box section of an aircraft that are fabricated from an embodiment of the hybrid laminates of the invention.
Figure 3B:
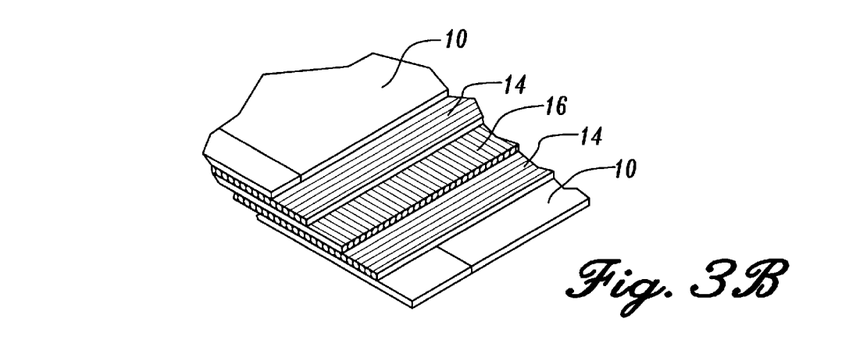
FIG. 3B schematically shows in cross section the foil and fiber orientation of a layup of the hybrid laminate for the strake sections of FIG. 3A.

FIG. 3A is a simplified diagram of a pair of strakes 28 with an adjoining wing box 30 with outboard wings 32. During flight the loads on these structures will be different, and will vary with speed and other factors. In accordance with the invention, an embodiment of the preferred metallic foil-polymer composite layup for the strakes is shown in simplified FIG. 3B. Thus, in the embodiment shown, the metallic foil 10 is oriented with its longest side parallel to the rear edge 29 of the strake 28, although orientation at 90° to the rear edge is also useful. Directly beneath the foil is a 90° cross-ply 14 with plies oriented at 90° to the longitudinal sides of the foil. Below this ply 14 is a second ply 16, with fibers oriented at zero degrees. Beneath ply 16 is a second cross-ply 14 followed by a foil layer 10. In accordance with the invention, the use of a composite that includes 90° cross-plies and 0° composite plies is preferred for the strakes of a supersonic delta-winged aircraft. The described layups are bonded to each side of a central core layer to form a symmetrical hybrid laminate structure.

Figure 3C:
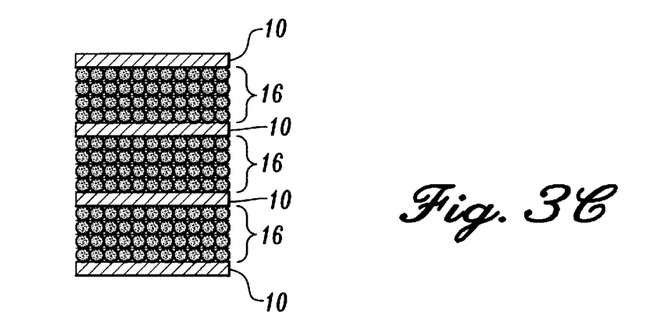
FIG. 3C schematically shows in cross section the foil and fiber layup in the wingbox of FIG. 3A.

On the other hand, the wing box is subjected to very different forces than the strake. Referring to FIG. 3C, each of two wing box layups are bonded to a central core structure and are identical so that the hybrid laminate formed is symmetrical. The layup shown in the embodiment of FIG. 3C has the following layers in succession: a first outer metallic foil layer 10; four successive span-wise oriented plies 16; a second foil layer 10; a second series of four span-wise oriented plies 16; a third foil layer 10; a third composite layer of four spanwise-oriented plies 16; and an outer foil layer 10. This outer foil layer 10 is bonded to one side of the core structure, and an identical layup is bonded to the other side of the core structure layer to form the symmetrical hybrid laminate of the wing box.

In an alternative embodiment of a wing box layup, the plies 16 are not all span-wise oriented, but the inner two of the four plies are oriented at an angle relative to the span-wise plies, for example at +45° and −45°, respectively. Thus, in each of the three layers of four plies, the first ply is span-wise, the second is oriented at +45°, the third is oriented at −45° and the fourth ply is span-wise. As a result, balanced composite layers are formed.

Figure 4A:
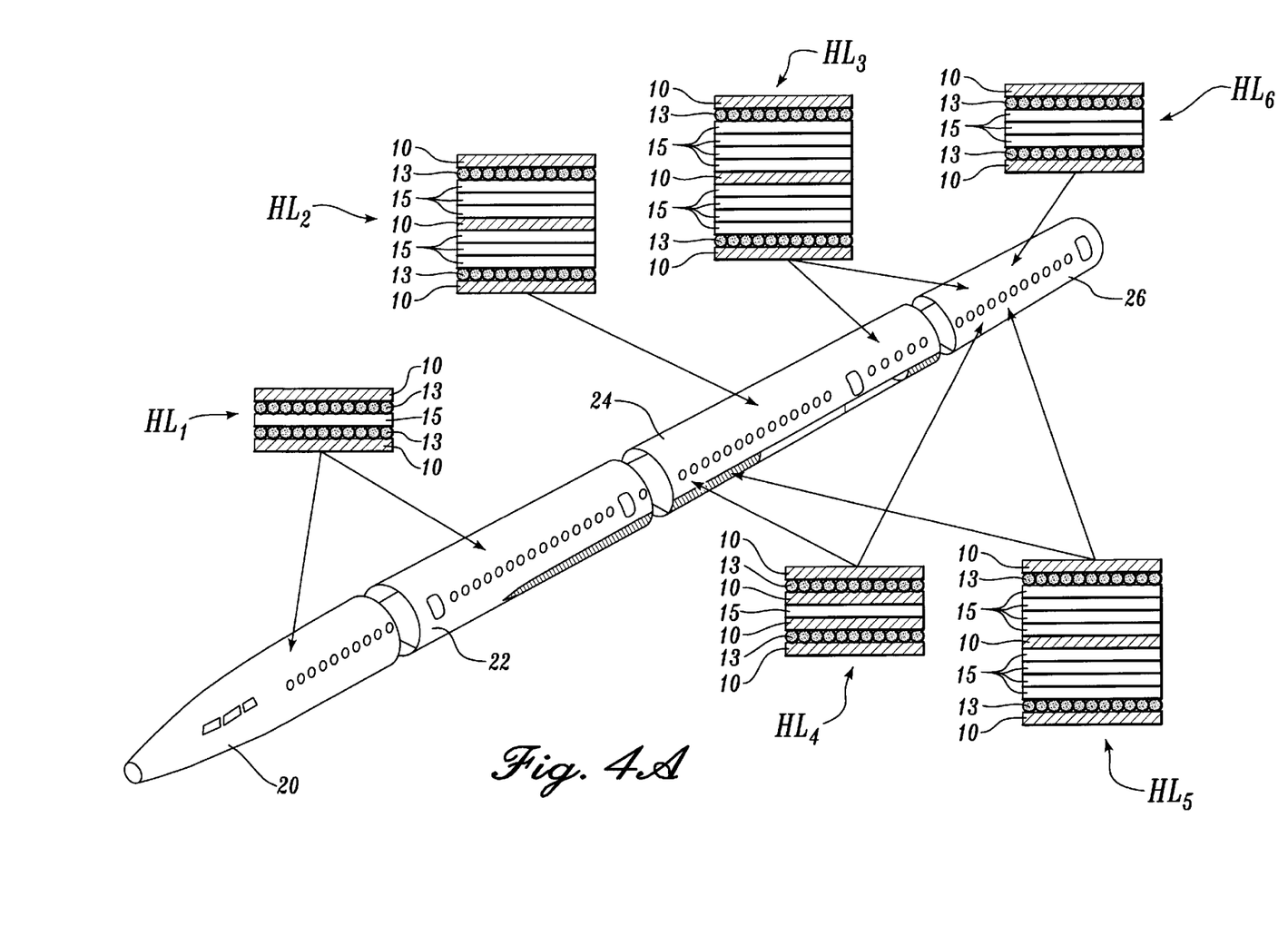
FIG. 4A is a schematic diagram illustrating an embodiment of a hybrid laminate aircraft fuselage and in cross section the fiber ply and metallic foil layups at various locations of the fuselage of an aircraft, in accordance with the invention.

The fuselage of a supersonic aircraft is subjected to different forces at different locations along its length. As a result, in accordance with the invention, ply orientation and ply "building ups" (or "padups") and "dropoffs" in the hybrid laminate structure are determined based upon the axial and circumferential loads caused by aircraft pressurization that the hybrid laminate will experience at a particular location on the fuselage. This is illustrated schematically in FIG. 4A, showing the full fuselage, exemplified in four sections, and six metallic foil-composite ply layups $HL_1$–$HL_6$ that may be found at different locations on the fuselage sections, depending upon load. The nose section 20 and first section 22 experience similar loads, and in accordance with the invention, have the same layup $HL_1$. In each case, the outer surface of the layup, and hence the hybrid laminate, is a metal, preferably titanium alloy, foil layer 10. The next layer, tenaciously bonded to the inboard surface of the metallic layer 10 is a cylindrical composite ply 13 with fibers extending continuously helically around the circumference of the cylindrical-shaped fuselage ("a hoop ply"). Inboard of, and tightly adherent to the hoop fiber ply, is a ply 15 with fibers oriented longitudinally along the length of the fuselage sections. This longitudinal fiber ply 15 forms the central layer of the symmetrical layup. Thus, inboard of the longitudinal fiber ply layer is a second hoop fiber ply 13 followed by a second titanium foil layer 10. The second titanium foil layer is bonded to one side of a core structure (not shown) and the same layup is repeated on the other side of the core to produce a symmetrical hybrid laminate.

Mid-aft section 24 may have four distinct ply orientations. A first layup $HL_2$ is designed to counteract tension normally encountered in the forward end of the crown of the fuselage, a second layup $HL_3$ designed to counteract tensile forces in the aft section of the crown, a third layup $HL_4$ for the sides that are normally under shear, and a fourth layup $HL_5$ to counteract the compressive forces normally found in the keel of the fuselage. Of course, all four ply layups form a unitary hybrid laminate structure together with a central core structure (not shown), but the number of plies and their orientation vary depending upon the forces the laminate is expected to withstand. Thus, in the forward section of the crown, the layup $HL_2$ has an outer titanium foil layer 10 that covers the entire exterior surface of the fuselage to protect the underlying composite structure. Tightly bonded to the inboard side of the foil 10 is a first hoop fiber ply 13, and inboard of this hoop ply, three longitudinal fiber plies 15. Inboard of the third longitudinal fiber ply is a second titanium alloy foil layer 10, that forms the center of symmetry of the layup. Thus, inboard of this foil 10 are, in order, three longitudinal fiber plies 15, a hoop fiber ply 13, and a final inboard titanium foil layer 10. The final titanium layer is bonded to one side of a core and the layup is repeated, symmetrically, on the other side of the core. This arrangement of plies and core provides a hybrid laminate structure that counteracts the tensile, shear, hoop and compression forces normally encountered in the front of the crown of the aircraft mid-aft fuselage section. In all sections of the fuselage the hoop plies counteract circumferential loads.

To counteract increased tensile stresses in the aft segment of the crown of fuselage section 24, and also the forward section of fuselage section 26, an additional longitudinal ply is added to the layup as shown in $HL_3$. Thus, the crown sections include, in order, an outer titanium foil 10, followed by a single hoop ply, four successive longitudinal composite plies, a central titanium foil 10, four successive longitudinal composite plies 15, a hoop composite ply 13, and an inner titanium foil layer 10. As before, the inner titanium foil of this layup is bonded to a central core and the layup is repeated on the other side of the core to produce a symmetrical hybrid laminate.

An aft portion of the crown of fuselage section 26 has a somewhat simplified layup structure $HL_6$, since tensile forces are not as high in this segment of the aircraft fuselage section. As a result, fewer plies may be used to produce a laminate that has the desired strength properties, but that is lighter than $HL_3$ or $HL_2$. Thus, the layup $HL_6$ aft crown segment of section 26 also has outer and inner titanium foil layers 10, and sandwiched therebetween, a composite layer that has a center including three longitudinal plies 15, with a hoop fiber ply interposed between each of the outermost of the longitudinal plies and the outer titanium foil layers 10. A core structure is sandwiched between two such layups, by bonding the foil layer to the core, to produce a symmetrical hybrid laminate structure.

Since the sides of the aircraft are subjected to shear, the hybrid laminate structure of the sides of sections 24 and 26 are tailored to counteract shear forces. As shown, in FIG. 4A, the side layup structure $HL_4$ of both sections 24 and 26, include, in order, an outer titanium foil layer 10, inboard of which is tightly adherent a hoop composite ply 13, inboard of which is a second titanium foil layer 10, inboard of which is a central longitudinal composite fiber ply 15. The layup is symmetrical, so that the pattern is repeated on the other side of the longitudinal fiber ply 15. Thus, the other plies are, in order from the central longitudinal fiber ply, a third titanium foil 10, followed by a hoop ply 13, and a titanium foil layer 10. One such layup is bonded to each side of a central core structure to produce a symmetrical hybrid laminate structure.

The keels of both sections 24 and 26 are preferably composed of a layup $HL_5$ that includes a central titanium foil layer 10 surrounded on either side by four longitudinal composite plies 15, preferably plies containing parallel-oriented boron fibers to counteract increased compressive stresses in the keel. The quadruple-layer of boron plies are each covered with at least a single composite hoop fiber ply 13. Thereafter, as is preferred in accordance with the invention, the composite hoop carbon fiber plies are covered with titanium foil 10. This foil is bonded to one side of a central core structure and the layup is repeated on the other side of the core to produce a symmetrical hybrid laminate.

Figure 4B:
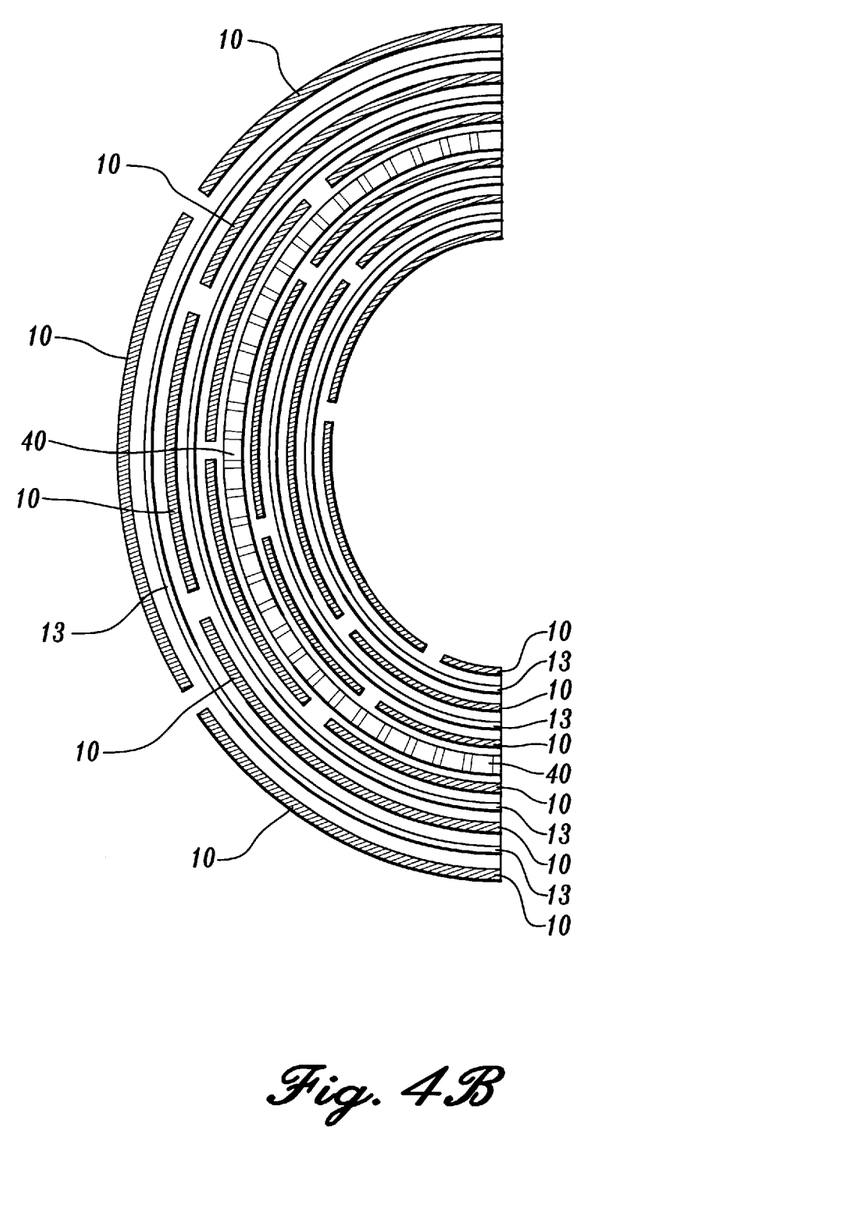
FIG. 4B is a schematic exploded cross-sectional view showing a portion of a hybrid laminate aircraft fuselage made in accordance with an embodiment of the invention.

A hybrid laminate fuselage section including a core structure, such as metallic honeycomb, for example titanium alloy honeycomb, is shown in FIG. 4B, depicting an exploded, schematic view of a partial cross section of a segment of a preferred hybrid laminate fuselage. It is preferred that the laminate structure be configured to optimally counteract the mechanical forces to which it would be subjected. In the embodiment shown, the fuselage section has an outer covering made up of longitudinally-extending titanium foils 10, each of the foils abutting against each other to provide a seal, thereby covering and protecting the underlying composite structure. Inboard of the titanium foil is a first hoop fiber composite ply 13, followed by a second layer of longitudinally-arranged titanium foils 10, followed by a second composite hoop fiber ply 13 and a third layer of longitudinal titanium foils 10. In the embodiment shown, the titanium foils are directly adhered, using a resinous adhesive and optionally a silane bonding agent, to a honeycomb core 40. A fourth longitudinal titanium foil 10 is likewise adhered onto the inboard surface of the honeycomb structure. Inboard of the fourth titanium foil 10, is adhered sequentially, a fourth composite hoop ply 13, a fifth longitudinal titanium foil layer 10, a fourth composite hoop ply 13, and a final titanium foil layer 10. Thus, the laminate is symmetrical about the central honeycomb layer 40. Importantly, the laminate structure has at least four hoop plies adding strength to the fuselage, the same holds for the embodiment of FIG. 4C, discussed below. A similar hybrid laminate fuselage section, 68 inches by 120 inches in size, with mass per unit area of 1.3 lb/ft$^2$, provided a safe pressure shell that was able to withstand 99,000 fatigue cycles of 14 ksi hooploads, and 12 ksi axial loads at an 0.20 Hz frequency load cycle with an "R" factor of 0.1.

Figure 4C:
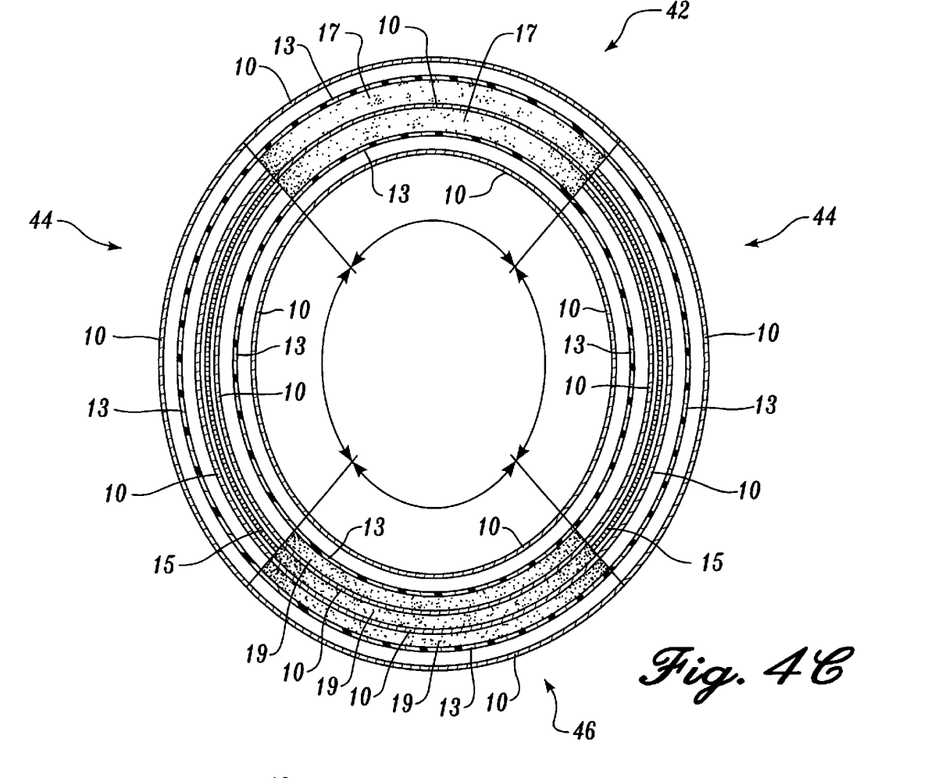
FIG. 4C is a schematic exploded cross-sectional illustration of an alternative embodiment of a layup forming part of a hybrid laminate fuselage of an aircraft in accordance with the invention.

FIG. 4C shows yet another embodiment of an aircraft fuselage layup, shown in schematic exploded cross section, in accordance with the invention. In this embodiment, the tension-critical crown area 42 of the fuselage contains multiple longitudinally-extending carbon plies, the shear-critical side sections 44 contain a single longitudinally-extending carbon ply, and the compression-critical keel section 46 contains multiple unidirectional longitudinally-extending boron-carbon plies. Significantly, however, the embodiment has at least two carbon fiber hoop plies 13 that extend throughout each layup of the hybrid laminate, making up a total of four such plies. These plies add strength to the fuselage to counteract forces encountered in use. Considering the layers of the layup, successively from the outside inward, the first layer of the fuselage is an outer layer of titanium foil 10. This is followed by a first carbon composite hoop ply 13 that extends the entire circumference of the fuselage. In the crown section 42, this is followed by a first layer 17 of multiple longitudinally-extending plies of carbon fibers, a second longitudinally-extending titanium foil 10, and a second longitudinally-extending layer 17 of multiple carbon plies. On the sides 44, the first carbon hoop ply 13 is followed by a second longitudinally-extending titanium foil 10, a longitudinally-extending carbon ply 15, and a third longitudinally-oriented titanium foil 10. In the keel 46, the first carbon hoop ply 13 is followed by a first layer 19 of multiple longitudinally-extending plies containing boron-carbon fibers, a second longitudinally-extending titanium foil 10, another longitudinally-extending layer 19 of multiple boron-carbon plies, a third longitudinally-extending titanium foil 10, and a third longitudinally-extending boron-carbon layer 19 of multiple plies. Each of the above-described layers is then followed by a second carbon hoop ply 13 that extends circumferentially around the entire circumference of the fuselage. The inboard face of this second carbon hoop ply 13 is covered by another layer including longitudinally-extending titanium foils 10. The latter titanium foil layer is then bonded to one side of a core structure and the above-described layup is repeated on the other side of the core to produce a symmetrical hybrid laminate structure.

Figure 4D:
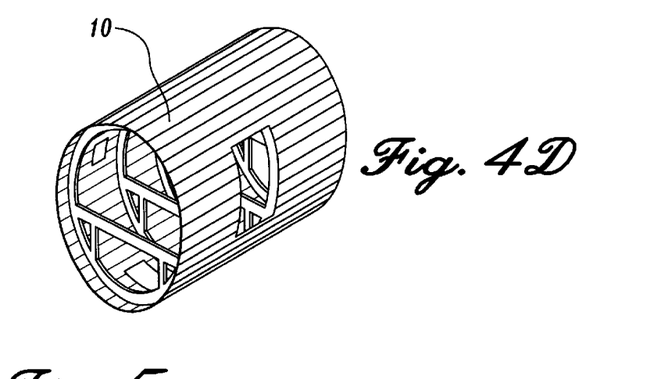
FIG. 4D is a schematic diagram showing the orientation of metallic foil on the outer and inner surfaces of an embodiment of hybrid laminate fuselage structure of the invention.

FIG. 4D further illustrates how foils are arranged on outer surfaces sequentially, in order to produce the foil-covered cylindrical-shaped fuselage sections of the invention, as shown in FIG. 4C. In the embodiment shown, the foil 10 is applied in alternating longitudinally-extending plies or "gore panels" that abut edge-to-edge to eliminate gaps. The foil may also be applied circumferentially in a hoop fashion, if required.

There are several methods for preparing the skin panels described and illustrated. As a preliminary matter, the titanium foil is usually supplied in the form of large rolls of foil and is then is slit into gore panels of predetermined length by a conventional cutting machine. In the context of a fuselage section, a gore panel is a longitudinal panel that extends from one end to the other of the fuselage section. Because the fuselage section may have a varying or changing circumference, the gore panel must be cut with varying width so that successive gore panels can be applied in an edge-to-edge relationship, preferably without overlapping. The gore panels are anodized by a conventional anodizing process, or the process described above, which forms an exterior coat on each of the gore panels that is more suitable for bonding to composite materials, such as pre-impregnated carbon tape. In accordance with the present invention, the gore panels are reeled onto a spool or cassette. These cassettes are delivered to a storage location near the production facility and stored until they are to be utilized in the lamination process. A layup mandrel, having an outer circumference conforming to the inner circumference of the fuselage, may be used to form the hybrid laminate or it may be laid up manually. Our concurrently-filed application, attorney docket No. BOCO-1-8434, hereby fully incorporated by reference, shows more details about the mandrel. The hybrid composite structure is applied to the mandrel by the lamination procedures described below. Thereafter, the hybrid laminate is removed from the mandrel, trimmed, window openings are cut in the structure, and other fastening devices and components are added to form a finished structure.

When the fuselage section is prepared on a mandrel, the mandrel is preferably rotatably-mounted, cylindrical-shaped with its longitudinal axis oriented in a vertical direction. A plurality of titanium gore panels are applied in a longitudinal direction to the exterior surface of the mandrel with a suitable releasable adhesive to form a first layer of titanium foil. Each gore panel is positioned on the layup mandrel with the longitudinal axis of the gore panel substantially parallel to the longitudinal axis of the layup mandrel. In some foil layers the gore panels may be in the form of hoops extending around the circumference of the mandrel, as discussed above. The gore panels are successively applied around the circumference of the layup mandrel in an edge-to-edge relationship (butt jointed) to form a smooth, continuous titanium foil layer covering the layup mandrel. Carbon prepreg tape (or another prepreg, as required) is then wound about the rotating mandrel in a direction transverse to, and preferably helically oriented relative to, the mandrel until a first hoop ply of composite material has been formed over the foil layer. Clearly, other ply orientations may also be applied, as required. A second layer of titanium foil may then be applied to the composite layer, followed by another ply or plies of composite material, followed by a final layer of titanium foil. In the event that the hybrid laminate includes a core structure, the core is produced in appropriately curved and sized panel-sections which are applied with adhesives to fit over the cylindrical-shaped laminate sections already laid down on the mandrel. The core is thus bonded to the underlying laminate structure. Thereafter, further layers of composite material and titanium foil are formed over the core, as explained above.

For use with layup mandrels having other geometries, the gore panels preferably have other shapes. For example, with a conically-shaped mandrel, the gore panels would preferably have a trapezoidal shape, i.e., one end of the gore panels would be wider than the other end. Thus, when the gore panels are laid upon a conical mandrel in edge-to-edge relationship, the wider ends would be proximate to the base of the cone shape. Conveniently, but not necessarily, each gore panel would therefore cover an approximately equal area of the mandrel for forming a smooth titanium foil layer. Accordingly, slitting the foil into gore panels includes pre-calculating the shape of the gore panels so that each gore panel covers an approximately equal area of the mandrel. Hence, when the gore panels are placed in edge-to-edge relationship on the mandrel, the gore panels form a smooth titanium foil layer.

As an alternative, the hybrid laminates may also be laid up manually or by machine. Under these conditions, to prepare a flat or curved laminate, such as a fuselage, the layers of foil and prepreg are manually stacked one atop the other with a central core structure, or other reinforcement. Thereafter, the stacked structure, with layers not adhering to each other, are enclosed in a vacuum bag and a vacuum is drawn causing atmospheric pressure to compress the layers against each other. This holds the layers in place so that they may be transported to an autoclave, press, or oven for curing of the resin. Upon appropriate heating of the resin, the stacked layers and core are adhered to each other and consolidated into the hybrid laminate of the invention.

Figure 5:
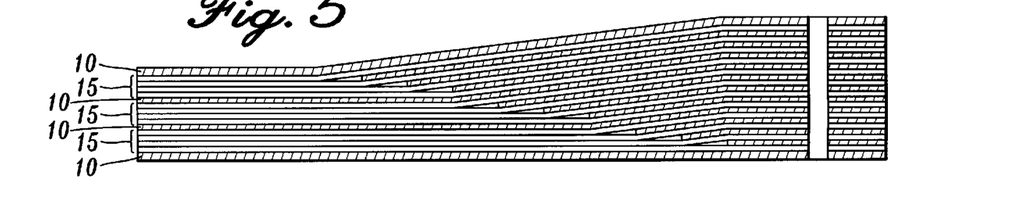
FIG. 5 is a schematic illustration, in cross section, of an embodiment of a padup of a layup of a hybrid laminate of the invention that is useful at joints.

FIG. 5 illustrates in schematic cross section, and in simplified form, a typical skin padup according to the invention, used at joints, to strengthen the hybrid laminate for receiving fasteners. Unlike prior art joint layups, the layup in accordance with the invention does not effect the basic skin layup, as described above. In the embodiment shown, the layup, usually repeated on either side of a central core of the hybrid laminate, includes outer titanium foils 10, between which are disposed three layers of composite, separated by two intermediate titanium foil layers 10. Each of the composite layers is made up of three plies. In order to strengthen the hybrid laminate at joints, additional titanium foils are interleaved between each of the composite plies. Thus, as shown, the structure of the layup surrounding the joint is made up of alternating plies of composite and layers of titanium foil. This provides a high strength structure for receiving fasteners to transfer loads between joined components of the aircraft.

When the layups are drilled through for joining together, the open-hole compressive strength of the layups is at least about 50 ksi. In certain embodiments of the layups, the strength can range up to at least about 80 ksi, and in others at least about 200 ksi. Also, the open-hole tensile strength is greater than about 55% of the unnotched ultimate tensile strength of the layup.

The layups of the hybrid laminates of the invention have high open-hole tensile and compressive strength, thereby facilitating mechanical joining together of hybrid laminates, while minimizing the potential for crack growth emanating from the throughbores in the laminates where forces are concentrated. When the composite volume fraction of the layup is less than 50%, then the open-hole tensile strength of the layup is in the range from about 150 to about 220 ksi. However, when the composite volume fraction of the layup is in the range from about 50 to about 80%, then the open-hole tensile strength increases to within the range from about 200 to about 350 ksi.

The open-hole compressive strength of the layup is dependent upon the type of reinforcing fiber used in the composites. Thus, for instance, layups of the invention with carbon fiber reinforcement have open-hole compressive strengths in the range from about 80 to about 125 ksi. However, when boron, HYBOR, or silicon carbide fibers are used, then the open-hole compressive strength of the layup increases to greater than 180 ksi.

The hybrid laminates of the invention have enhanced ultimate tensile strength and ultimate compressive strength. Indeed, when the layups of the invention are loaded in the primary fiber orientation direction, the ultimate tensile strength of the layups exceeds $2 \times 10^6$ psi/lb/in$^3$, and the ultimate compressive strength exceeds $1.5 \times 10^6$ psi/lb/in$^3$. Consequently, hybrid laminate structures of the invention are eminently suitable for use in the structure of a supersonic civilian transport aircraft.

While the above description has focused on the use of the hybrid laminates of the invention in aircraft, specifically supersonic aircraft, it is clear that the laminates are useful in a variety of other applications that require a lightweight, high strength-to-weight ratio material that may have some of the other enhanced properties discussed above.

While the preferred embodiments of the invention have been illustrated and described, one of ordinary skill in the art may appreciate that various changes can be made therein without departing from the spirit and scope of the invention and that these changes are also encompassed in the following claims.

We claim:

1. A symmetrical hybrid laminate comprising:
   (a) a pair of layups, each of the layups comprising:
      (i) a heat treated beta titanium alloy foil layer comprising butt-joined foils each of thickness in the range from about 0.003 to about 0.01 inches; and
      (ii) a layer of polymeric composite bonded to a side of the foil layer, the polymeric layer comprising at least one ply comprising a polymeric matrix, the matrix resistant to repeated exposure to temperatures of at least about 350° F., the composite having commonly aligned fibers embedded in the matrix; and
   (b) a central honeycomb core layer, each of the pair of layups bonded to one side of the core layer to form the symmetrical hybrid laminate.

2. The hybrid laminate of claim 1, wherein the polymer is selected from the group consisting of polyaryletherketone, polyetheretherketone, polyimides, polyarylethersulfone, oxydiphthalic dianhydride 3, 4' oxydianiline, and functional derivatives thereof.

3. The hybrid laminate of claim 1, wherein the at least one ply is from about 0.005 to about 0.03 inches thick.

4. The hybrid laminate of claim 1, wherein the foil layer is heat-treated to a yield strain of greater than 1%.

5. The hybrid laminate of claim 1, wherein the foil layer is pretreated to produce a surface for more tenacious bonding to the polymeric matrix.

6. The hybrid laminate of claim 1, wherein the fibers are selected from the group consisting of carbon and boron fibers.

7. The hybrid laminate of claim 1, wherein the fibers are continuous fibers.

8. The hybrid laminate of claim 1, wherein the open-hole tensile strength of the laminate, is greater than about 55% of the unnotched ultimate strength of the laminate.

9. The hybrid laminate of claim 1, wherein the open-hole compression strength of the laminate is at least about 50 ksi.

10. The hybrid laminate of claim 1, wherein crack-growth rate, after crack initiation in the hybrid laminate, is less than about 0.2% of the crack-grow rate of the titanium alloy in monolithic form.

11. The hybrid laminate of claim 1, wherein a majority of the fibers of the hybrid laminate are aligned in a common direction.

12. The hybrid laminate of claim 1, wherein each of the pair of layups comprises a first and a second layer of metal foil, the layers of metal foil separated by an intervening layer of polymeric composite bonded to sides of each of the layers of foil, and wherein each of the layers of foil comprise butt-joined gore panels such that butt joints of the first layer are offset from butt joints of the second layer.

13. The hybrid laminate of claim 12, wherein the first layer of metal foil of each of the layups is an outer layer of the hybrid laminate.

14. The hybrid laminate of claim 1, further comprising another layer of polymeric composite, the another layer comprising commonly aligned reinforcing fibers, the fibers aligned at 90° relative to fibers of the layer of polymeric composite of (a)(ii).

15. An aircraft skin panel, the panel comprised of a symmetrical hybrid laminate, the laminate comprising:
   (a) a honeycomb core having two sides; and
   (b) a pair of layups, one of the pair bonded to each side of the core, each of the layups comprising laminated layers of:
      (i) heat treated beta titanium alloy gore panels having a thickness in the range from about 0.003 to about 0.01 inches, the panels butt-joined to form a continuous foil layer; and
      (ii) an organic polymeric composite layer between adjacent foil layers, the composite layer comprising at least one ply, the at least one ply comprising a polymeric matrix resistant to repeated exposure to high temperatures encountered in supersonic flight, the polymeric matrix having commonly aligned reinforcing fibers embedded therein.

16. The aircraft skin panel of claim 15, wherein each of the layups further comprises an outer layer of titanium alloy foil, the outer layer bonded to an adjacent composite ply.

17. The aircraft skin panel of claim 15, wherein the high temperature resistant matrix is selected from the group consisting of polyaryletherketone, polyetheretherketone, polyimides, polyarylethersulfone, oxydiphthalic dianhydride 3, 4' oxydianiline, and functional derivatives thereof.

18. The aircraft skin panel of claim 15, wherein the open-hole tensile strength of each of the layups is greater than about 55% of the unnotched ultimate strength of the layup.

19. The aircraft skin panel of claim 15, wherein the open-hole compressive strength of each of the layups is at least about 50 ksi.

20. The aircraft skin panel of claim 15, wherein the crack-growth rate, after crack initiation in the aircraft skin panel, is less than about 0.2% of the crack-growth rate of the titanium alloy in monolithic form.

21. The aircraft skin panel of claim 15, wherein the reinforcing fibers are selected from the group consisting of graphite and boron fibers.

22. The aircraft skin panel of claim 15, wherein the ultimate tensile strength exceeds about $2 \times 10^6$ psi/lb/in$^3$.

23. The aircraft skin panel of claim 15, wherein the ultimate compressive strength exceeds about $1.5 \times 10^6$ psi/lb/in$^3$.

24. The aircraft skin panel of claim 15, wherein each layup comprises a first and a second layer of metal foil, the layers of metal foil separated by an intervening layer of polymeric composite bonded to sides of each of the layers of foil, and wherein each of the layers of foil comprise butt-joined gore panels such that butt joints of the first layer are offset from butt joints of the second layer.

25. The aircraft skin panel of claim 24, wherein the first layer of metal foil of each of the layups is an outer layer of the hybrid laminate.

* * * * *

UNITED STATES PATENT AND TRADEMARK OFFICE
CERTIFICATE OF CORRECTION

PATENT NO. : 5,866,272
DATED : February 2, 1999
INVENTOR(S) : W.N. Westre et al.

It is certified that error appears in the above-indentified patent and that said Letters Patent is hereby corrected as shown below:

On the title page, Item [56] Other Publications,

| COLUMN | LINE | |
|---|---|---|
| [56] Pg. 1, col. 1 | Refs. Cited (Other publs., Item 1) | "A-gray" should read --A. Gray-- |
| 14 (Claim 10, | 36 line 3) | "crack-grow" should read --crack-growth-- |

Signed and Sealed this

Sixth Day of July, 1999

Attest:

Attesting Officer

Q. TODD DICKINSON

Acting Commissioner of Patents and Trademarks